(12) United States Patent
Li (10) Patent No.: US 12,445,829 B2
(45) Date of Patent: Oct. 14, 2025

(54) ESIM CARD CHANGE METHOD AND RELATED DEVICE

(71) Applicant: HUAWEI TECHNOLOGIES CO., LTD., Guangdong (CN)

(72) Inventor: Tao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/651,182

(22) Filed: Apr. 30, 2024

(65) Prior Publication Data

US 2024/0357342 A1    Oct. 24, 2024

Related U.S. Application Data

(63) Continuation of application No. 17/554,065, filed on Dec. 17, 2021, now Pat. No. 12,035,416, which is a (Continued)

(30) Foreign Application Priority Data

Jun. 21, 2019 (CN) .......................... 201910558493.3

(51) Int. Cl.
  *H04W 8/24* (2009.01)
  *H04W 4/50* (2018.01)
  (Continued)

(52) U.S. Cl.
  CPC ............ *H04W 8/205* (2013.01); *H04W 4/50* (2018.02); *H04W 12/06* (2013.01); *H04W 12/72* (2021.01)

(58) Field of Classification Search
  None
  See application file for complete search history.

(56) References Cited

U.S. PATENT DOCUMENTS

2016/0021529 A1* 1/2016 Park .................. H04W 8/205
                                                              455/410
2016/0301529 A1   10/2016 Park et al.
(Continued)

FOREIGN PATENT DOCUMENTS

CN        102917339 A        2/2013
CN        103747104 A        4/2014
(Continued)

*Primary Examiner* — Gary Lafontant
(74) *Attorney, Agent, or Firm* — Rimon PC (57) ABSTRACT

An embedded subscriber identification module (eSIM) card change method and a related device are disclosed. The method includes receiving, by an entitlement server, a first card change request sent by a terminal device, where the first card change request includes a user account, a password, a user number, and embedded universal integrated circuit card (eUICC) identification. The method further includes verifying a user identity of the terminal device based on the user account and the password. If the verification succeeds, a second card change request is sent to an operator business support system (BSS). The second card change request includes the user number and the eUICC identification, and the second card change request is used to indicate to the BSS to complete the eSIM card change and to indicate to an eSIM server to generate an eSIM profile and associate the eSIM profile with the eUICC identification.

20 Claims, 6 Drawing Sheets

Related U.S. Application Data continuation of application No. PCT/CN2020/096938, filed on Jun. 19, 2020.

(51) Int. Cl.
*H04W 8/20* (2009.01)
*H04W 12/06* (2021.01)
*H04W 12/72* (2021.01)

(56) References Cited

U.S. PATENT DOCUMENTS

| | | |
|---|---|---|
| 2017/0171742 A1 | 6/2017 | Yang |
| 2019/0028881 A1* | 1/2019 | Namiranian ......... H04B 1/3816 |
| 2019/0053040 A1 | 2/2019 | Long |

FOREIGN PATENT DOCUMENTS

| | | |
|---|---|---|
| CN | 105050071 A | 11/2015 |
| CN | 105530106 A | 4/2016 |
| CN | 106028312 A | 10/2016 |
| CN | 106937274 A | 7/2017 |
| CN | 108029011 A | 5/2018 |
| CN | 108848493 A | 11/2018 |
| CN | 109168156 A | 1/2019 |
| CN | 109219035 A | 1/2019 |
| CN | 110351346 A | 10/2019 |
| EP | 3276998 A1 | 1/2018 |
| WO | 2018076711 A1 | 5/2018 |

* cited by examiner

ESIM CARD CHANGE METHOD AND RELATED DEVICE

CROSS-REFERENCE TO RELATED APPLICATIONS

This application is a continuation of U.S. patent application Ser. No. 17/554,065, filed on Dec. 17, 2021, which is a continuation of International Application No. PCT/CN2020/096938, filed on Jun. 19, 2020, which claims priority to Chinese Patent Application No. 201910558493.3, filed on Jun. 21, 2019. All of the aforementioned patent applications are hereby incorporated by reference in their entireties.

TECHNICAL FIELD

This application relates to the field of electronic technologies, and in particular, to an embedded subscriber identification module (eSIM) card change method and a related device.

BACKGROUND

There is a trend for subscriber identification modules (SIM) card technology to evolve from conventional universal integrated circuit cards (UICC) to embedded universal integrated circuit cards (eUICC). The eUICCs are embedded into a mainboard of terminal products, and support remote SIM provisioning. A user may purchase an operator plan online and download an embedded subscriber identification module (eSIM) profile online for activation and use. It is a gradual process for the transition from a SIM terminal to an eSIM terminal. This transition includes use scenarios of an upgrade from a SIM card device to a new eSIM card device and an upgrade from an original eSIM device to a new device. However, an existing eSIM card change procedure has conventionally been relatively complex and time-consuming.

SUMMARY

Embodiments of this application provide an eSIM card change method and a related device, to simplify an eSIM card change procedure and improve eSIM card change efficiency.

According to a first aspect, an embodiment of this application provides an eSIM card change method, including: An entitlement server receives a first card change request sent by a terminal device, where the first card change request includes a user account, a password, a user number, and eUICC identification; verifies a user identity of the terminal device based on the user account and the password; and if the verification succeeds, sends a second card change request to an operator business support system (BSS), where the second card change request includes the user number and the eUICC identification, and the second card change request is used to indicate to the BSS to complete eSIM card change and to indicate to an eSIM server to generate an eSIM profile and associate the eSIM profile with the eUICC identification. In this way, eSIM card change procedures can be completed online, and therefore an eSIM card change operation procedure is simplified, and eSIM card change efficiency is improved.

In some embodiments, after sending the second card change request to the operator BSS, the entitlement server receives a card change completion notification sent by the BSS; and sends a card change success notification to the terminal device. The card change success notification is used to indicate to the terminal device to download the eSIM profile from the eSIM server. In this way, it is notified online that the eSIM profile is prepared, and therefore eSIM card change efficiency is improved.

In some embodiments, the card change success notification includes an activation code, and the activation code is used by the terminal device to activate the downloaded eSIM profile. In this way, automatic eSIM activation is implemented, and therefore eSIM card change efficiency is improved.

According to a second aspect, an embodiment of this application provides an eSIM card change method, including: An operator business support system (BSS) receives a second card change request sent by an entitlement server, where the second card change request is sent after the entitlement server receives a first card change request sent by a terminal device and verifies a user identity of the terminal device based on a user account and a password and the verification succeeds, the first card change request includes the user account, the password, a user number, and eUICC identification, and the second card change request includes the user number and the eUICC identification; and sends a notification message to an eSIM server, where the notification message includes the eUICC identification, and the notification message is used to indicate to the eSIM server to generate an eSIM profile and associate the eSIM profile with the eUICC identification. In this way, eSIM card change procedures can be completed online, and therefore an eSIM card change operation procedure is simplified, and eSIM card change efficiency is improved.

In some embodiments, after receiving the second card change request sent by the entitlement server (ES), the BSS retains the user number, generates new eSIM card data, and binds the user number and the generated eSIM card data, to complete eSIM card change, so that the terminal device implements a communications service by using the original user number.

In some embodiments, the BSS receives a response message sent by the eSIM server; and sends a card change completion notification to the entitlement server. The card change completion notification is used to indicate to the entitlement server to instruct the terminal device to download the eSIM profile from the eSIM server. In this way, it is notified online that the eSIM profile is prepared, and therefore eSIM card change efficiency is improved.

In some embodiments, the BSS may verify the user identity of the terminal device based on the user account and the password, to ensure eSIM card change security.

According to a third aspect, an embodiment of this application provides an eSIM card change method, including: a terminal device obtains a user number, eUICC identification, a user account, and a password; and sends a first card change request to an entitlement server, where the first card change request includes the user account, the password, the user number, and the eUICC identification, the first card change request is used to indicate to the entitlement server to verify a user identity of the terminal device based on the user account and the password and send a second card change request to an operator business support system BSS after the verification succeeds, the second card change request includes the user number and the eUICC identification, and the second card change request is used to indicate to the BSS to complete eSIM card change and to indicate to an eSIM server to generate an eSIM profile and associate the eSIM profile with the eUICC identification. In this way, eSIM card change procedures can be completed online, and therefore an eSIM card change operation procedure is simplified, and eSIM card change efficiency is improved.

In some embodiments, the terminal device receives a card change success notification sent by the entitlement server; and downloads the eSIM profile from the eSIM server. In this way, the eSIM profile is downloaded online to complete eSIM card change, and therefore eSIM card change efficiency is improved.

In some embodiments, the terminal device activates the eSIM profile based on an activation code.

In some embodiments, the terminal device obtains the user number from a cloud server; copies the user number from another terminal device; or receives the user number entered by a user.

According to a fourth aspect, an embodiment of this application provides a first apparatus for changing an eSIM card. The first apparatus is configured to implement the method and function performed by the entitlement server in the first aspect, and is implemented by using hardware/software. The hardware/software thereof includes a module corresponding to the function.

According to a fifth aspect, an embodiment of this application provides a second apparatus for changing an eSIM card. The second apparatus is configured to implement the method and function performed by the BSS in the second aspect, and is implemented by using hardware/software. The hardware/software thereof includes a module corresponding to the function.

According to a sixth aspect, an embodiment of this application provides a third apparatus for changing an eSIM card. The third apparatus is configured to implement the method and function performed by the terminal device in the third aspect, and is implemented by using hardware/software. The hardware/software thereof includes a module corresponding to the function.

According to a seventh aspect, an embodiment of this application provides an entitlement server, including a processor, a memory, and a communications bus. The communications bus is configured to implement connection and communication between the processor and the memory, and the processor executes a program stored in the memory, to implement the steps in the first aspect.

In a possible design, the entitlement server provided in this application may include a module corresponding to behavior of the entitlement server in the foregoing method designs. The module may be software and/or hardware.

According to an eighth aspect, an embodiment of this application provides a BSS, including a processor, a memory, and a communications bus. The communications bus is configured to implement connection and communication between the processor and the memory, and the processor executes a program stored in the memory, to implement the steps in the second aspect.

In a possible design, the BSS provided in this application may include a module corresponding to behavior of the BSS in the foregoing method designs. The module may be software and/or hardware.

According to a ninth aspect, an embodiment of this application provides a terminal device, including a processor, a memory, and a communications bus. The communications bus is configured to implement connection and communication between the processor and the memory, and the processor executes a program stored in the memory, to implement the steps in the third aspect.

In a possible design, the terminal device provided in this application may include a module corresponding to behavior of the terminal device in the foregoing method designs. The module may be software and/or hardware.

According to a tenth aspect, this application provides a computer-readable storage medium. The computer-readable storage medium stores instructions. When the instructions are run on a computer, the computer is enabled to perform the methods in the foregoing aspects.

According to an eleventh aspect, this application provides a computer program product including instructions. When the computer program product runs on a computer, the computer is enabled to perform the methods in the foregoing aspects.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

The following describes the embodiments of this application with reference to the accompanying drawings in the embodiments of this application.

To change an existing subscriber identification module (SIM) card terminal device, a SIM card needs to be removed from the original terminal device and inserted into a new terminal device for use. However, an embedded universal integrated circuit card (eUICC) card of an embedded subscriber identification module (eSIM) terminal device cannot be removed, and an eSIM profile in the eUICC card is associated with eUICC identification (EID) of the original terminal device, and cannot be read and copied. Based on an existing eSIM standard and procedure, to change a terminal device, a user needs to apply to an operator for an eSIM card change service, and provides EID of a new eSIM terminal device for the operator. Then the operator generates a new eSIM profile for the new EID. In this case, a phone number of the user remains unchanged. After the eSIM profile is generated, a two-dimensional code used to download the eSIM profile is generated, and the user scans the two-dimensional code by using the new terminal to download the new eSIM profile to a new eUICC. An example eSIM card change procedure is as follows:

(1) The user comes to an operator service hall with the new eSIM terminal device, and applies for a service of migrating the user number used by the original eSIM terminal device to the new eSIM terminal device at a service counter. (2) The user provides the EID of the new eSIM terminal for a counter attendant. (3) The user waits for the attendant to process an eSIM card number migration request. (4) After an operator system processes the migration request, an activation code of the newly generated eSIM profile is printed. (5) The user scans the activation code by using the new eSIM terminal to download the eSIM profile. This eSIM card change procedure has the following disadvantages: The card change procedure is performed offline, is relatively complex and cumbersome, is time-consuming, and features poor experience. In addition, offline service operation costs of the operator are increased. To resolve the foregoing technical problem, the embodiments of this application provide the following solutions.

Figure 1:
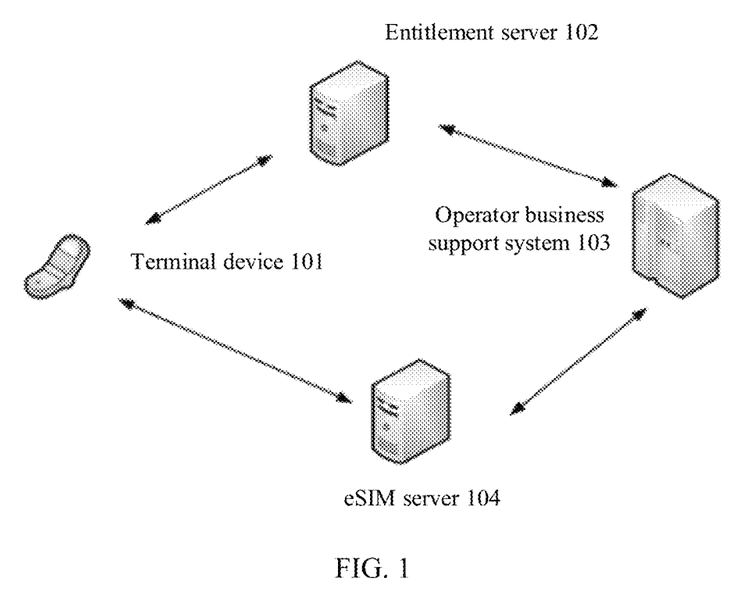
FIG. 1 is a schematic diagram of an architecture of an eSIM card change system, according to an embodiment of this application.

FIG. 1 is a schematic diagram of an architecture of an eSIM card change system according to an embodiment of this application. The eSIM card change system includes a terminal device 101, an entitlement server (ES) 102, an operator business support system (BSS) 103, and an eSIM server 104. The terminal device 101 may be a cellular phone, a smartphone, a portable computer, a handheld communications device, a handheld computing device, a satellite radio apparatus, a global positioning system, a personal digital assistant (PDA), any other proper device configured to implement communication in a wireless communications system 100, and/or the like. The entitlement server 102 may be a server deployed and maintained by an operator, or may be a server deployed and maintained by a terminal vendor, and is configured to verify a user identity of a terminal device. The operator business support system 103 is a resource-orientated (e.g., a network, a device, or a computer system) background support system, includes a professional network management system, a resource management system, a professional provisioning system, a service assurance system, and the like, and provides support for reliable, secure, and stable network operation. The eSIM server 104 may be a subscription manager-data preparation plus server (SM-DP+), and may be configured to: generate an eSIM profile, and provide the eSIM profile for the terminal device for downloading. Optionally, the eSIM card change system may further include a cloud server and another terminal device.

Figure 2:
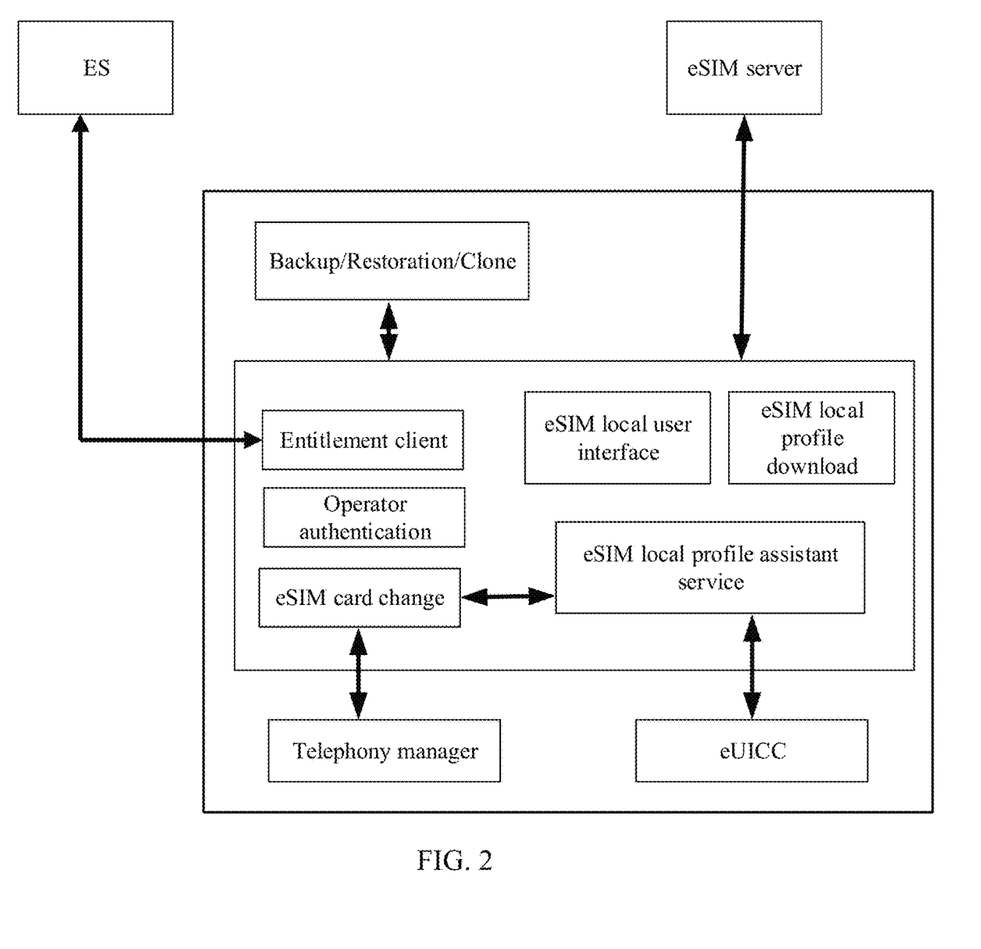
FIG. 2 is a schematic diagram of an architecture of a software system, according to an embodiment of this application.

FIG. 2 is a schematic diagram of an architecture of a software system according to an embodiment of this application. The software system includes an eSIM server, an ES, and a terminal device. The terminal device may include a backup/restoration/clone module, an entitlement client module, an operator authentication module, an eSIM card change module, an eSIM local profile download (LPD) module, an eSIM local user interface (LUI), an eSIM local profile assistant (LPA) service module, and an eUICC. An interface between the LPD of the terminal device and each of the ES and the eSIM server is configured to provide a secure data transmission channel.

Figure 3:
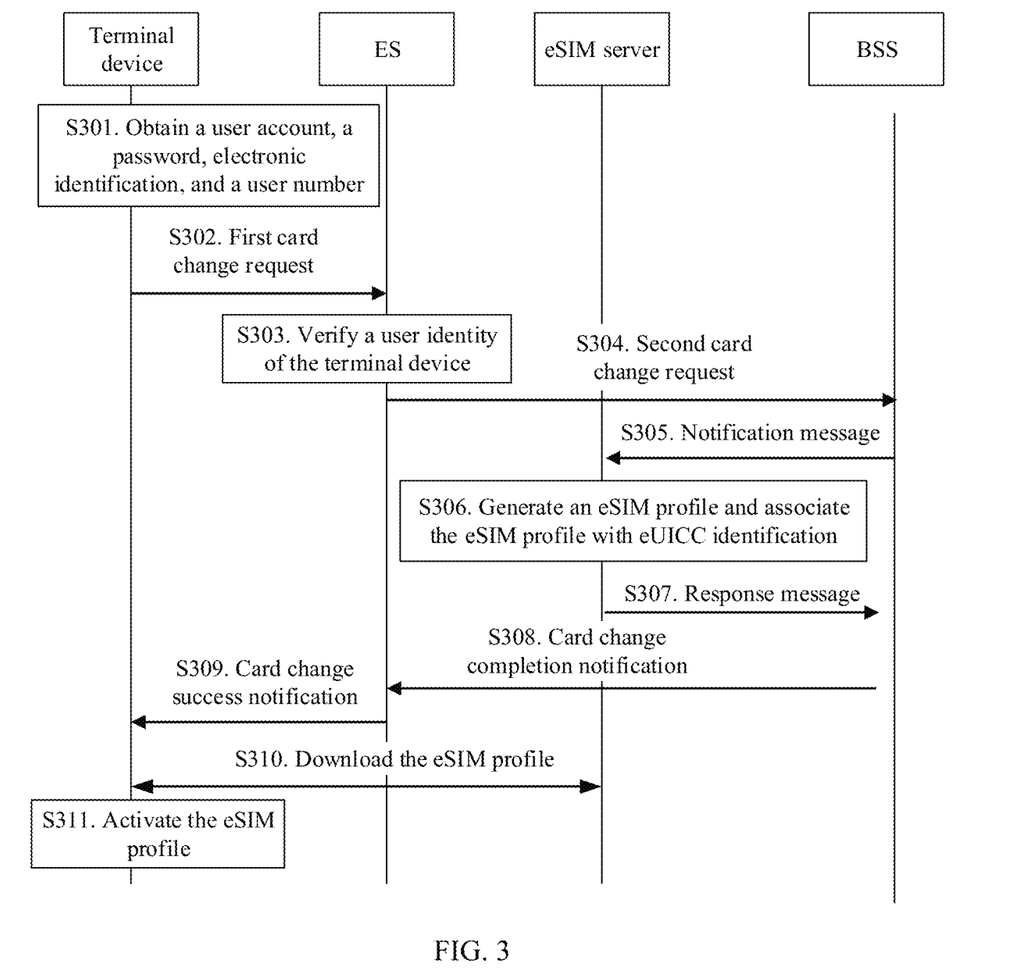
FIG. 3 is a schematic flowchart of an eSIM card change method, according to an embodiment of this application.

FIG. 3 is a schematic flowchart of an eSIM card change method according to an embodiment of this application. This embodiment of this application includes at least the following steps.

S301. A terminal device obtains a user account, eUICC identification, a password, and a user number.

In some embodiments, the terminal device may log in to a cloud server, and send a restoration request to the cloud server. After receiving the restoration request, the cloud server returns a plurality of user numbers, and the terminal device selects, from the plurality of user numbers, a user number that needs to be restored. Alternatively, the terminal device may receive the user number entered by a user. Alternatively, the terminal device may select content that needs to be copied, and send a copy request to another terminal device (for example, an original terminal device), and the another terminal device returns the copied content after receiving the copy request. The user number is migrated online from the another terminal device in this cloning manner. The user number is a mobile station international subscriber directory number (MSISDN). The user number may be a user number used by the original terminal device. In addition, the terminal device may receive the user account and the password entered by the user. The user account may be an account registered by the user, or may be an email address, a user name, a mobile phone number, or the like. The terminal device may obtain EID from configuration information. The EID may be a sequence number.

S302. The terminal device sends a first card change request to an ES, and the ES receives the first card change request sent by the terminal. The first card change request includes the user account, the password, the user number, and the EID of the terminal device.

S303. The ES verifies a user identity of the terminal device based on the user account and the password.

In some embodiments, the ES may determine whether the received user account and the received password are the same as a prestored user account and a prestored password. If the received user account and the received password are the same as the prestored user account and the prestored password, the verification succeeds, and S304 is performed. If the received user account and the received password are different from the prestored user account and the prestored password, verification fails. In this case, the ES may send verification failure information to the terminal device to prompt the user to re-enter the user account and the password, and S301 is performed again. If a quantity of times of re-entering the user account and the password by the user exceeds a preset threshold, prohibition information may be sent to the terminal device. The prohibition information is used to indicate to the terminal device to prohibit, in a period of time, the user from entering the user account and the password. The preset threshold may be 3, 4, or the like.

S304. The ES sends a second card change request to a BSS. The second card change request may include the user number and the EID of the terminal device, or the second card change request may include the user account, the password, the user number, and the EID of the terminal device. After receiving the second card change request sent by the ES, the BSS retains the user number, generates new eSIM card data, and binds the user number and the generated eSIM card data, to complete eSIM card change, so that the terminal device implements a communications service by using the original user number. The eSIM card data may include an integrated circuit card identity (ICCID) and the like.

Optionally, the BSS may verify the user identity of the terminal device based on the user account and the password. If the verification succeeds, S305 is performed. If verification fails, verification may be performed again based on step S303.

S305. The BSS sends a notification message to an eSIM server, and the eSIM server receives the notification message sent by the BSS. The notification message includes the EID of the terminal device, and may further include the generated eSIM card data.

S306. The eSIM server may generate an eSIM profile based on the eSIM card data, and associate the eSIM profile with the EID. The eSIM profile is a new eSIM profile generated by the terminal device when accessing a network.

S307. The eSIM server sends a response message to the BSS, and the BSS receives the response message sent by the eSIM server. The response message is used to indicate that the eSIM profile is prepared.

S308. The BSS sends a card change completion notification to the ES, and the ES receives the card change completion notification sent by the BSS. The card change completion notification includes an activation code.

S309. The ES sends a card change success notification to the terminal device, and the terminal device receives the card change success notification sent by the ES. The card change success notification includes the activation code.

S310. The terminal device downloads the eSIM profile from the eSIM server.

In some embodiments, after receiving the card change success notification sent by the ES, the terminal device may send, to the eSIM server, a download request that carries the EID of the terminal device. After receiving the download request, the eSIM server may obtain, based on the EID of the terminal device, the eSIM profile associated with the EID, and send the eSIM profile to the terminal device.

S311. After receiving the eSIM profile, the terminal device activates the eSIM profile by using the activation code, so that the terminal device may access the network for communication.

In some embodiments of this application, the terminal device may send a card change request to the ES, the ES sends a card change request to the BSS after completing entitlement, and the BSS indicates to the eSIM server to generate the eSIM profile and associate the eSIM profile with the EID. In this case, the terminal device may download the eSIM profile from the eSIM server, and after activating the eSIM profile, may implement communication by using the original user number. In this way, eSIM card change procedures can be completed online, and automatic eSIM activation is implemented, and therefore an eSIM card change operation procedure is simplified, and eSIM card change efficiency is improved.

The foregoing describes in detail the method in the embodiments of this application. The following provides apparatuses in the embodiments of this application.

Figure 4:
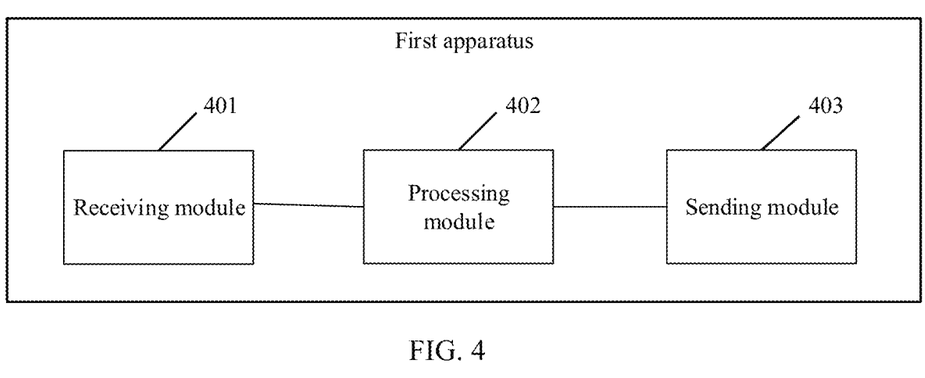
FIG. 4 is a schematic diagram of a structure of a first apparatus for changing an eSIM card, according to an embodiment of this application.

FIG. 4 is a schematic diagram of a structure of a first apparatus for changing an eSIM card according to an embodiment of this application. The first apparatus may include a receiving module 401, a processing module 402, and a sending module 403. Detailed description of the modules is as follows:

The receiving module 401 is configured to receive a first card change request sent by a terminal device. The first card change request includes a user account, a password, a user number, and eUICC identification.

The processing module 402 is configured to verify a user identity of the terminal device based on the user account and the password.

The sending module 403 is configured to: if the verification succeeds, send a second card change request to an operator BSS. The second card change request includes the user number and the eUICC identification, and the second card change request is used to indicate to the BSS to instruct an eSIM server to generate an eSIM profile and associate the eSIM profile with the eUICC identification.

Optionally, the receiving module 401 is further configured to receive a card change completion notification sent by the BSS; and the sending module 403 is further configured to send a card change success notification to the terminal device. The card change success notification is used to indicate the terminal device to download the eSIM profile from the eSIM server.

The card change success notification includes an activation code, and the activation code is used by the terminal device to activate the downloaded eSIM profile.

It should be noted that for implementation of each module, refer to the corresponding description in the method embodiment shown in FIG. 3, to perform the method and function performed by the entitlement server in the foregoing embodiment.

Figure 5:
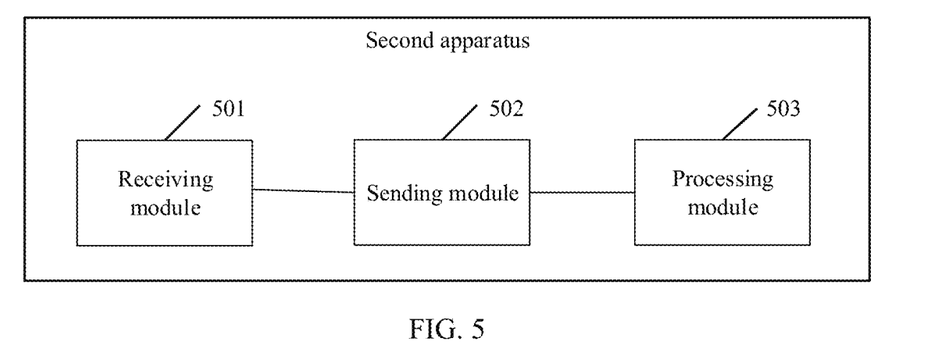
FIG. 5 is a schematic diagram of a structure of a second apparatus for changing an eSIM card, according to an embodiment of this application.

FIG. 5 is a schematic diagram of a structure of a second apparatus for changing an eSIM card according to an embodiment of this application. The second apparatus may include a receiving module 501, a sending module 502, and a processing module 503. Detailed description of the modules is as follows:

The receiving module 501 is configured to receive a second card change request sent by an entitlement server. The second card change request is sent after the entitlement server receives a first card change request sent by a terminal device and verifies a user identity of the terminal device based on a user account and a password and the verification succeeds. The first card change request includes the user account, the password, a user number, and eUICC identification. The second card change request includes the user number and the eUICC identification.

The sending module 502 is configured to send a notification message to an eSIM server. The notification message includes the eUICC identification, and the notification message is used to indicate to the eSIM server to generate an eSIM profile and associate the eSIM profile with the eUICC identification.

Optionally, the second apparatus further includes: the processing module 503, configured to store the user number.

Optionally, the receiving module 501 is further configured to receive a response message sent by the eSIM server; and the sending module 502 is further configured to send a card change completion notification to the entitlement server. The card change completion notification is used to indicate to the entitlement server to instruct the terminal device to download the eSIM profile from the eSIM server.

The processing module 503 is further configured to verify the user identity of the terminal device based on the user account and the password.

It should be noted that for implementation of each module, refer to corresponding descriptions of the method embodiment shown in FIG. 3, to perform the method and the function performed by the BSS in the foregoing embodiments.

Figure 6:
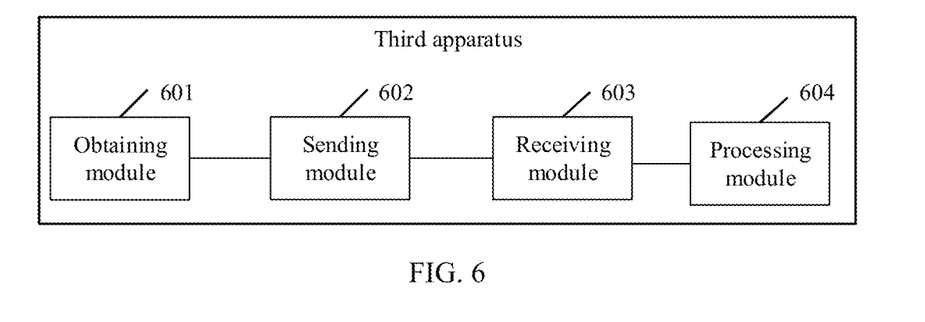
FIG. 6 is a schematic diagram of a structure of a third apparatus for changing an eSIM card, according to an embodiment of this application.

FIG. 6 is a schematic diagram of a structure of a third apparatus for changing an eSIM card according to an embodiment of this application. The third apparatus may include an obtaining module 601, a sending module 602, a receiving module 603, and a processing module 604. Detailed description of the modules is as follows:

The obtaining module 601 is configured to obtain a user number, eUICC identification, a user account, and a password.

The sending module 602 is configured to send a first card change request to an entitlement server. The first card change request includes the user account, the password, the user number, and the eUICC identification. The first card change request is used to indicate to the entitlement server to verify a user identity of a terminal device based on the user account and the password and send a second card change request to an operator BSS after the verification succeeds. The second card change request includes the user number and the eUICC identification. The second card change request is used to indicate to the BSS to instruct an eSIM server to generate an eSIM profile and associate the eSIM profile with the eUICC identification.

Optionally, the third apparatus further includes: the receiving module 603, configured to receive a card change success notification sent by the entitlement server; and the obtaining module 601 is further configured to download the eSIM profile from the eSIM server.

Optionally, the third apparatus further includes: the processing module 604, configured to activate the eSIM profile based on an activation code.

Optionally, the obtaining module 604 is further configured to: obtain the user number from a cloud server; copy the user number from another terminal device; or receive the user number entered by a user.

It should be noted that, for implementation of each module, refer to corresponding descriptions of the method embodiment shown in FIG. 3, to perform the method and the function performed by the terminal device in the foregoing embodiment.

Figure 7:
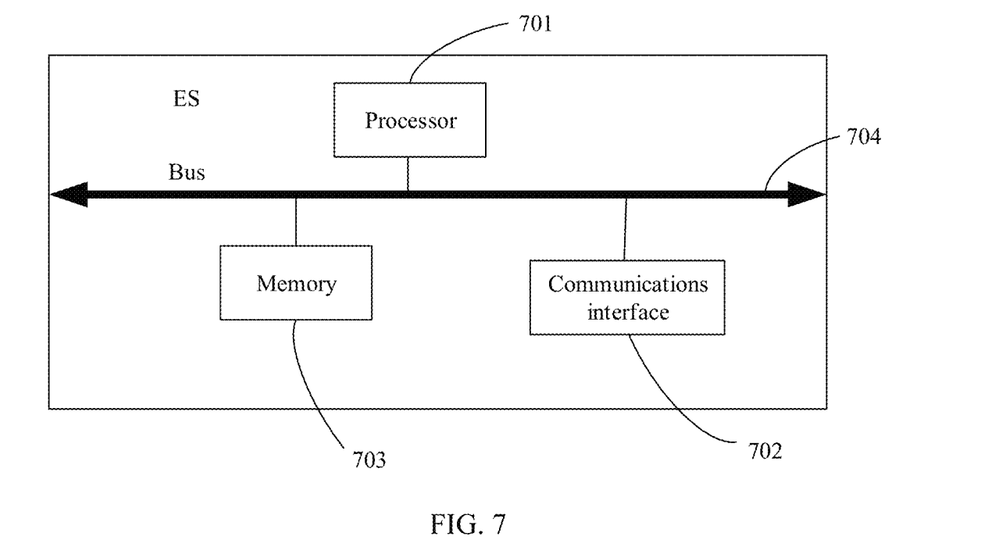
FIG. 7 is a schematic diagram of a structure of an entitlement server, according to an embodiment of this application.

FIG. 7 is a schematic diagram of a structure of an entitlement server according to an embodiment of this application. As shown in FIG. 7, the entitlement server may include at least one processor 701, at least one communications interface 702, at least one memory 703, and at least one communications bus 704.

The processor 701 may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communications bus 704 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus. The communications bus 704 is configured to implement connection and communication between these components. The communications interface 702 in the device in some embodiments of this application is configured to perform signaling or data communication with another node device. The memory 703 may include a volatile memory, for example, a nonvolatile random access memory (NVRAM), a phase-change random-access memory (phase change RAM, PRAM), or a magnetoresistive random-access memory (magnetoresistive RAM, MRAM). The memory 703 may further include a nonvolatile memory, for example, at least one magnetic disk storage device, an electrically erasable programmable read-only memory (EEPROM), a flash storage device such as a NOR flash memory or a NAND flash memory, or a semiconductor device such as a solid state drive (SSD). Optionally, the memory 703 may be at least one storage apparatus that is far away from the processor 701. Optionally, the memory 703 may further store a group of program code. Optionally, the processor 701 may further execute a program executed in the memory 703.

The processor 701 is configured to perform the following operations: receiving a first card change request sent by a terminal device, where the first card change request includes a user account, a password, a user number, and eUICC identification; verifying a user identity of the terminal device based on the user account and the password; and if the verification succeeds, sending a second card change request to an operator BSS. The second card change request includes the user number and the eUICC identification, and the second card change request is used to indicate to the BSS to instruct an eSIM server to generate an eSIM profile and associate the eSIM profile with the eUICC identification.

Optionally, the processor 701 is further configured to perform the following operations: receiving a card change completion notification sent by the BSS; and sending a card change success notification to the terminal device. The card change success notification is used to indicate the terminal device to download the eSIM profile from the eSIM server.

The card change success notification includes an activation code, and the activation code is used by the terminal device to activate the downloaded eSIM profile.

Further, the processor may further cooperate with the memory and the communications interface to perform the operation of the entitlement server in the foregoing embodiments of this application.

Figure 8:
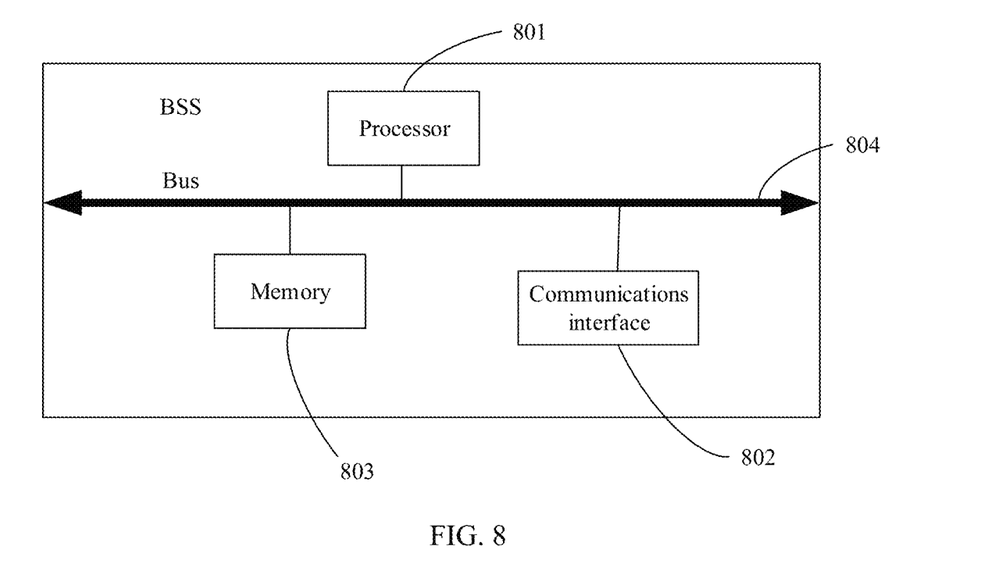
FIG. 8 is a schematic diagram of a structure of an operator business support system, according to an embodiment of this application.

FIG. 8 is a schematic diagram of a structure of an operator business support system according to an embodiment of this application. As shown in the figure, the operator business support system may include at least one processor 801, at least one communications interface 802, at least one memory 803, and at least one communications bus 804.

The processor 801 may be processors of various types that are mentioned above. The communications bus 804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus. The communications bus 804 is configured to implement connection and communication between these components. The communications interface 802 in the device in an embodiments of this application is configured to perform signaling or data communication with another node device. The memory 803 may be memories of various types mentioned above. Optionally, the memory 803 may alternatively be at least one storage apparatus that is far away from the processor 801. The memory 803 stores a group of program code, and the processor 801 executes a program executed by the object attribute memory (OAM) in the memory 803.

The processor 801 is configured to perform the following operations: receiving a second card change request sent by an entitlement server, where the second card change request is sent after the entitlement server receives a first card change request sent by a terminal device and verifies a user identity of the terminal device based on a user account and a password and the verification succeeds, the first card change request includes the user account, the password, a user number, and eUICC identification, and the second card change request includes the user number and the eUICC identification; and sending a notification message to an eSIM server, where the notification message includes the eUICC identification, and the notification message is used to indicate to the eSIM server to generate an eSIM profile and associate the eSIM profile with the eUICC identification.

Optionally, the processor 801 is further configured to perform the following operation:

storing the user number.

Optionally, the processor 801 is further configured to perform the following operations:

receiving a response message sent by the eSIM server; and sending a card change completion notification to the entitlement server. The card change completion notification is used to indicate to the entitlement server to instruct the terminal device to download the eSIM profile from the eSIM server.

Optionally, the processor 801 is further configured to perform the following operation:

verifying the user identity of the terminal device based on the user account and the password.

Further, the processor may cooperate with the memory and the communications interface, to perform the operation performed by the operator business support system in the foregoing embodiment of this application.

Figure 9:
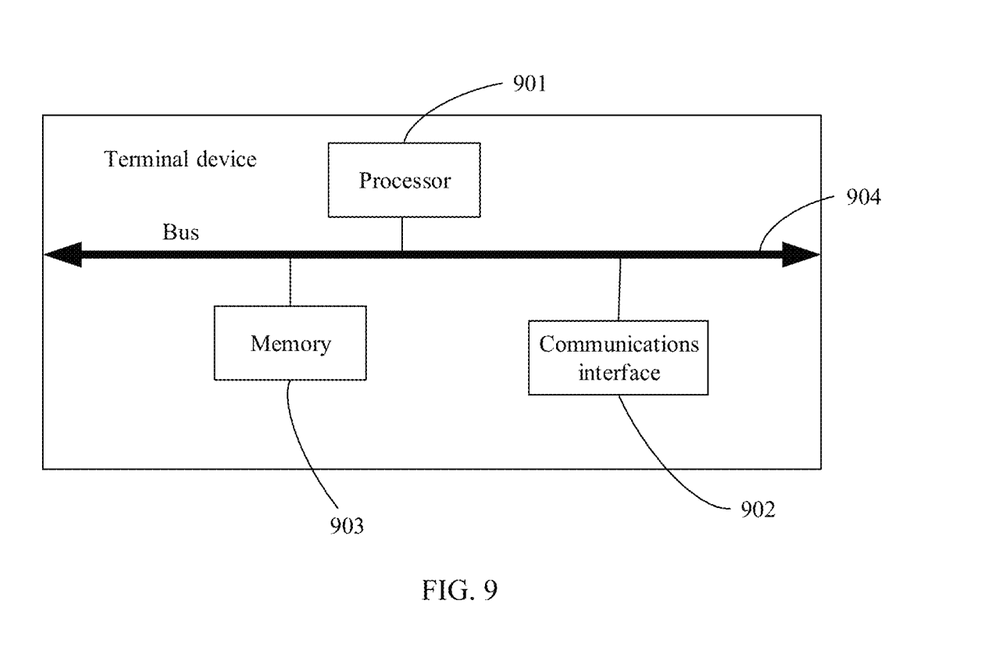
FIG. 9 is a schematic diagram of a structure of a terminal device, according to an embodiment of this application.

FIG. 9 is a schematic diagram of a structure of a terminal device according to an embodiment of this application. As shown in the figure, the terminal device may include at least one processor 901, at least one communications interface 902, at least one memory 903, and at least one communications bus 904.

The processor 901 may be processors of various types that are mentioned above. The communications bus 904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus. The communications bus 904 is configured to implement connection and communication between these components. The communications interface 902 in the device in some embodiments of this application is configured to perform signaling or data communication with another node device. The memory 903 may be memories of various types mentioned above. Optionally, the memory 903 may alternatively be at least one storage apparatus far away from the processor 901. The memory 903 stores a group of program code, and the processor 901 executes a program executed by the OAM in the memory 903.

The processor 901 is configured to perform the following operations: obtaining a user number, eUICC identification, a user account, and a password; and sending a first card change request to an entitlement server. The first card change request includes the user account, the password, the user number, and the eUICC identification. The first card change request is used to indicate to the entitlement server to verify a user identity of the terminal device based on the user account and the password and send a second card change request to an operator BSS after the verification succeeds. The second card change request includes the user number and the eUICC identification. The second card change request is used to indicate to the BSS to instruct an eSIM server to generate an eSIM profile and associate the eSIM profile with the eUICC identification.

Optionally, the processor 901 is further configured to perform the following operations: receiving, by the terminal device, a card change success notification sent by the entitlement server; and downloading, by the terminal device, the eSIM profile from the eSIM server.

Optionally, the processor 901 is further configured to perform the following operation: activating the eSIM profile based on an activation code.

Optionally, the processor 901 is further configured to perform the following operation: obtaining the user number from a cloud server; copying the user number from another terminal device; or receiving the user number entered by a user.

Further, the processor may further cooperate with the memory and the communications interface to perform operations of the terminal device in the foregoing embodiments of this application.

An embodiment of this application further provides a chip system. The chip system includes a processor, configured to support an entitlement server, an operator business support system, or a terminal device in implementing a function in any one of the foregoing embodiments, for example, generating or processing data and/or information in the foregoing method. In a possible design, the chip system may further include a memory. The memory is configured to store program instructions and data that are necessary for the entitlement server, the operator business support system, or the terminal device. The chip system may include a chip, or may include a chip and another discrete component.

An embodiment of this application further provides a processor. The processor is configured to be coupled to a memory, and is configured to perform any method and function of the entitlement server, the operator business support system, or the terminal device in any one of the foregoing embodiments.

An embodiment of this application further provides a computer program product that includes instructions. When the computer program product is run on a computer, the computer is enabled to perform any method and function of the entitlement server, the operator business support system, or the terminal device in any one of the foregoing embodiments.

An embodiment of this application further provides an apparatus configured to perform any method and function of the entitlement server, the operator business support system, or the terminal device in any one of the foregoing embodiments.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

The invention claimed is:

1. An embedded subscriber identification module (eSIM) card change method, performed by a terminal device, comprising:
   obtaining a user number and an embedded universal integrated circuit card (eUICC) identification; and
   sending a card change request to a server, wherein the card change request comprises the user number and the eUICC identification;
   receiving a card change success notification from the server; and
   downloading an eSIM profile according to the card change success notification, wherein the eSIM profile is related to the user number and the eUICC identification.

2. The method according to claim 1, wherein the card change success notification comprises an activation code, and the method further comprises:
   activating the eSIM profile based on the activation code.

3. The method according to claim 1, wherein the obtaining of the user number comprises:
   obtaining the user number from a cloud server.

4. The method according to claim 3, wherein the user number is obtained by selecting from a plurality of user numbers received from the cloud server.

5. The method according to claim 4, wherein the method further comprises:
   logging in the cloud server;
   sending, to the cloud server, a restoration request; and
   receiving, from the cloud server, the plurality of user numbers.

6. The method according to claim 1, wherein the obtaining of the user number comprises:
   copying the user number from another terminal device.

7. The method according to claim 6, wherein the other terminal device is a terminal device that uses the user number.

8. The method according to claim 1, wherein the obtaining of the user number comprises:
   obtaining the user number entered by a user.

9. The method according to claim 1, wherein the card change request further comprises a user account and a password, wherein the user account and the password are used for verifying a user identity of the terminal device.

10. The method according to claim 1, wherein the eSIM profile is downloaded from an eSIM server, and wherein the eSIM profile is generated by the eSIM server.

11. A terminal device, comprising:
    one or more processors; and
    a computer readable medium that includes computer-executable instructions;
    wherein the one or more processors are configured to execute the computer-executable instructions to enable the terminal device to perform operations comprising:
    obtaining a user number and an embedded universal integrated circuit card (eUICC) identification; and
    sending a card change request to a server, wherein the card change request comprises the user number and the eUICC identification;
    receiving a card change success notification from the server; and
    downloading an eSIM profile according to the card change success notification, wherein the eSIM profile is related to the user number and the eUICC identification.

12. The terminal device according to claim 11, wherein the card change success notification comprises an activation code, and the one or more processors are further configured to execute the computer-executable instructions to enable the terminal device to perform:
    activating the eSIM profile based on the activation code.

13. The terminal device according to claim 11, wherein the obtaining of the user number comprises:
    obtaining the user number from a cloud server.

14. The terminal device according to claim 13, wherein the user number is obtained by selecting from a plurality of user numbers received from the cloud server.

15. The terminal device according to claim 14, wherein the one or more processors are further configured to execute the computer-executable instructions to enable the terminal device to perform:
    logging in the cloud server;
    sending, to the cloud server, a restoration request; and
    receiving, from the cloud server, the plurality of user numbers.

16. The terminal device according to claim 11, wherein the operation of obtaining the user number comprises:
    copying the user number from another terminal device.

17. The terminal device according to claim 16, wherein the other terminal device is a terminal device that uses the user number.

18. The terminal device according to claim 11, wherein the operation of obtaining the user number comprises:
    obtaining the user number entered by a user.

19. The terminal device according to claim 11, wherein the card change request further comprises a user account and a password, and wherein the user account and the password are used for verifying a user identity of the terminal device.

20. The terminal device according to claim 11, wherein the eSIM profile is downloaded from an eSIM server, and wherein the eSIM profile is generated by the eSIM server.

* * * * *